(12) United States Patent
Adelson

(10) Patent No.: US 11,042,626 B2
(45) Date of Patent: Jun. 22, 2021

(54) METHOD OF AND SYSTEM FOR AUTHENTICATING A USER FOR SECURITY AND CONTROL

(71) Applicant: Nextek Power Systems, Inc., Detroit, MI (US)

(72) Inventor: Alex M. Adelson, Andes, NY (US)

(73) Assignee: NEXTEK POWER SYSTEMS, INC., Detroit, MI (US)

( * ) Notice: Subject to any disclaimer, the term of this patent is extended or adjusted under 35 U.S.C. 154(b) by 165 days.

(21) Appl. No.: 15/984,482

(22) Filed: May 21, 2018

(65) Prior Publication Data
US 2019/0354670 A1 Nov. 21, 2019

(51) Int. Cl.
*G06F 21/36* (2013.01)
*G06F 16/29* (2019.01)

(52) U.S. Cl.
CPC .............. *G06F 21/36* (2013.01); *G06F 16/29* (2019.01)

(58) Field of Classification Search
CPC ................................ G06F 21/36; G06F 16/29
USPC .......................................................... 726/18
See application file for complete search history.

(56) References Cited

U.S. PATENT DOCUMENTS

| | | | |
|---|---|---|---|
| 9,985,786 B1 * | 5/2018 | Bhabbur | G09C 5/00 |
| 2008/0104394 A1 | 5/2008 | Want | |
| 2014/0270344 A1 * | 9/2014 | Krishnamoorthi | G06K 9/6211 |
| | | | 382/103 |
| 2015/0289103 A1 * | 10/2015 | Jabara | H04W 4/80 |
| | | | 455/457 |
| 2017/0277520 A1 * | 9/2017 | Keller | G06F 8/34 |
| 2017/0329944 A1 | 11/2017 | Satyavarapu | |
| 2017/0346851 A1 * | 11/2017 | Drake | H04L 63/1466 |
| 2018/0144112 A1 * | 5/2018 | Pitel | G06F 21/14 |
| 2019/0057199 A1 * | 2/2019 | Hutchinson | G06F 21/42 |
| 2019/0182050 A1 * | 6/2019 | Famechon | H04L 9/14 |
| 2020/0349538 A1 * | 11/2020 | Glaser | G06K 9/00892 |
| 2020/0404019 A1 * | 12/2020 | Drake | H04L 9/3226 |

FOREIGN PATENT DOCUMENTS

EP 3048773 1/2016

OTHER PUBLICATIONS

Chow et al., "The Death of the Internet", First Edition. Edited by Markus Jakobsson. ©2012 John Wiley & Sons, Inc. Published 2012 by John Wiley & Sons, Inc (Year: 2012).*
International search report dated Jun. 19, 2019 mailed in corresponding International application No. PCT/US19/19700.

* cited by examiner

*Primary Examiner* — Khalil Naghdali
(74) *Attorney, Agent, or Firm* — Dickinson Wright PLLC

(57) ABSTRACT

A user is authenticated to a defined space, by entering identification data and phone data that respectively identify the user and the user's phone to a server, by sending an application from the server along a wireless connection to the user's phone after entry of the identification data and the phone data by executing the application received by the user's phone to create a virtual symbol of virtual characters in the user's phone, by posting a security symbol in the defined space, by capturing a security image of security characters from the security symbol with the user's phone, by comparing the security characters with the virtual characters, and by authenticating the user to the defined space when the virtual characters match the security characters.

10 Claims, 3 Drawing Sheets

METHOD OF AND SYSTEM FOR AUTHENTICATING A USER FOR SECURITY AND CONTROL

FIELD OF THE DISCLOSURE

The present disclosure relates generally to a method of, and a system for, authenticating one or more users, under a security protocol, to manage entries and exits through portals, as well as presence detection and geographic guidance in a defined space or venue, and/or to control one or more electrical devices in the defined space.

BACKGROUND

Entries and exits through portals, as well as presence detection and geographic guidance in a defined space, such as an office or a building, need to be managed under a security protocol, so that access to the space is provided only for people authorized to enter and move through the space. Similarly, equipment, information and services available in the space need to be protected from unintended or unauthorized access, change or destruction. Hence, authenticating the identity of an individual person to reduce the risk of unauthorized access to, and travel through, the space and/or unauthorized operation of such equipment is critical for venue security. Various techniques for authenticating the identity of the user generally include requiring the presentation of a first factor defined by something the user knows (e.g., a password, a personal identification number (PIN), etc.) in combination with at least one other factor, such as something the user has (e.g., a smart card, a hardware or software token, etc.) and/or something the user is (e.g., a biometric characteristic). U.S. Pat. No. 9,198,041 describes capturing an optical image of a coded symbol printed, for example, on a business card, to identify the user to permit operation of equipment in a venue.

As advantageous as such authentication techniques are, however, they are generally made available only to those governmental, medical, scientific, and engineering organizations requiring the highest security protocols and are seldom granted to more conventional commercial users, such as business offices. The availability of such authentication techniques is limited by the desire on the part of the commercial users to keep their operational costs down. Multi-factor credentials are expensive, require end-user training, and require sophisticated support processes. Hardware and software tokens add to additional system costs. Larger deployments also have to factor in the increased costs associated with inventory management, shipment, and replacement of such tokens. In addition, the optical capture of a printed symbol on a business card merely identifies the user, and does not indicate other parameters as, for example, where, when, or by what route the user is permitted to travel through the space.

Accordingly, there is a need to authenticate one or more users, under a security protocol, to manage entries and exits through portals of a defined space, as well as presence detection and geographic guidance in the space, and/or to control one or more electrical devices in the space, in a cost-efficient manner without sacrificing system security.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION

In accordance with one feature of this invention, a method of authenticating a user to a defined space is performed by entering identification data and phone data that respectively identify the user and the user's phone to a server, by sending an application from the server along a wireless connection to the user's phone after entry of the identification data and the phone data, by executing the application received by the user's phone to create a virtual symbol of virtual characters in the user's phone, by posting at least one security symbol in the defined space, by capturing a security image of security characters from the security symbol with the user's phone, by comparing the security characters with the virtual characters, and by authenticating the user to the defined space when the virtual characters match the security characters.

Advantageously, privilege data indicative of privileges granted to the user in the defined space is also entered together with the entry of the identification data and the phone data. The privilege data may include such parameters as the date and the time during which the user is permitted to access the defined space, and/or one or more geographic locations in the defined space at which the authenticated user is granted access, and/or one or more electrical devices in the defined space which the authenticated user is permitted to operate. A security symbol is posted in close association with each geographic location and/or with each electrical device. Preferably, a route to the geographic locations in the defined space is displayed on the user's phone to reliably guide the user. In a preferred embodiment, the privilege data is also configured to identify a Boolean logic condition to be satisfied in order to authenticate the user to the defined space.

In accordance with another feature of this invention, a system for authenticating a user to a defined space includes a user's phone having a solid-state imaging sensor, and a server for receiving identification data and phone data that respectively identify the user and the user's phone. The server is configured to send an application from the server along a wireless connection to the user's phone after receipt of the identification data and the phone data. The user's phone is configured to execute the application to create a virtual symbol of virtual characters. A security symbol is posted in the defined space. The imaging sensor in the user's phone is configured to capture a security image of security characters from the security symbol. The user's phone is configured to compare the security characters with the virtual characters, and to authenticate the user to the defined space when the virtual characters match the security characters. Privilege data indicative of privileges granted to the user in the defined space is also advantageously received by the server together with the receipt of the identification data and the phone data.

Figure 1:
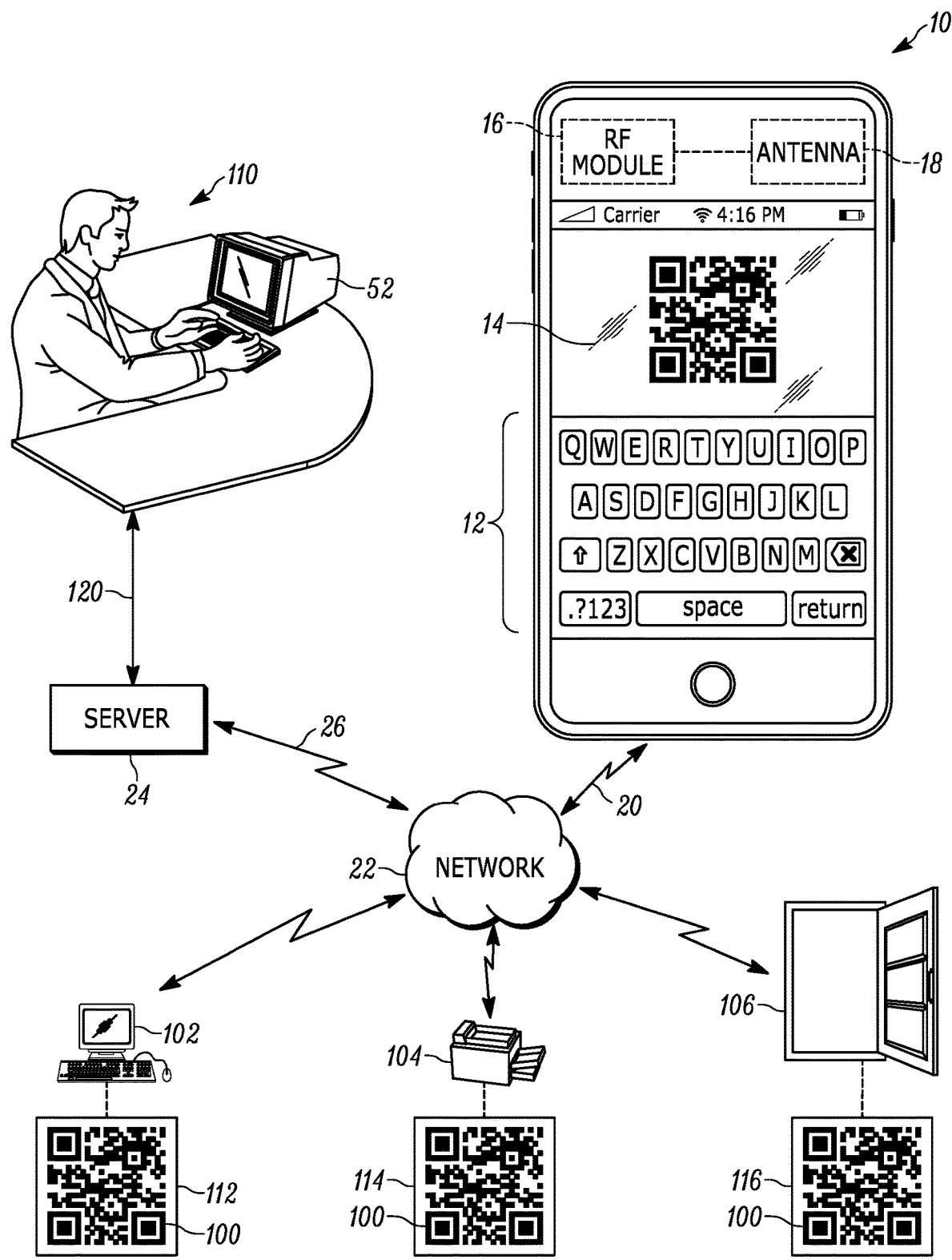
FIG. 1 is a diagrammatic view of a system for authenticating a user to a defined space and/or to operate one or more electrical devices in accordance with this disclosure.
Figure 2:
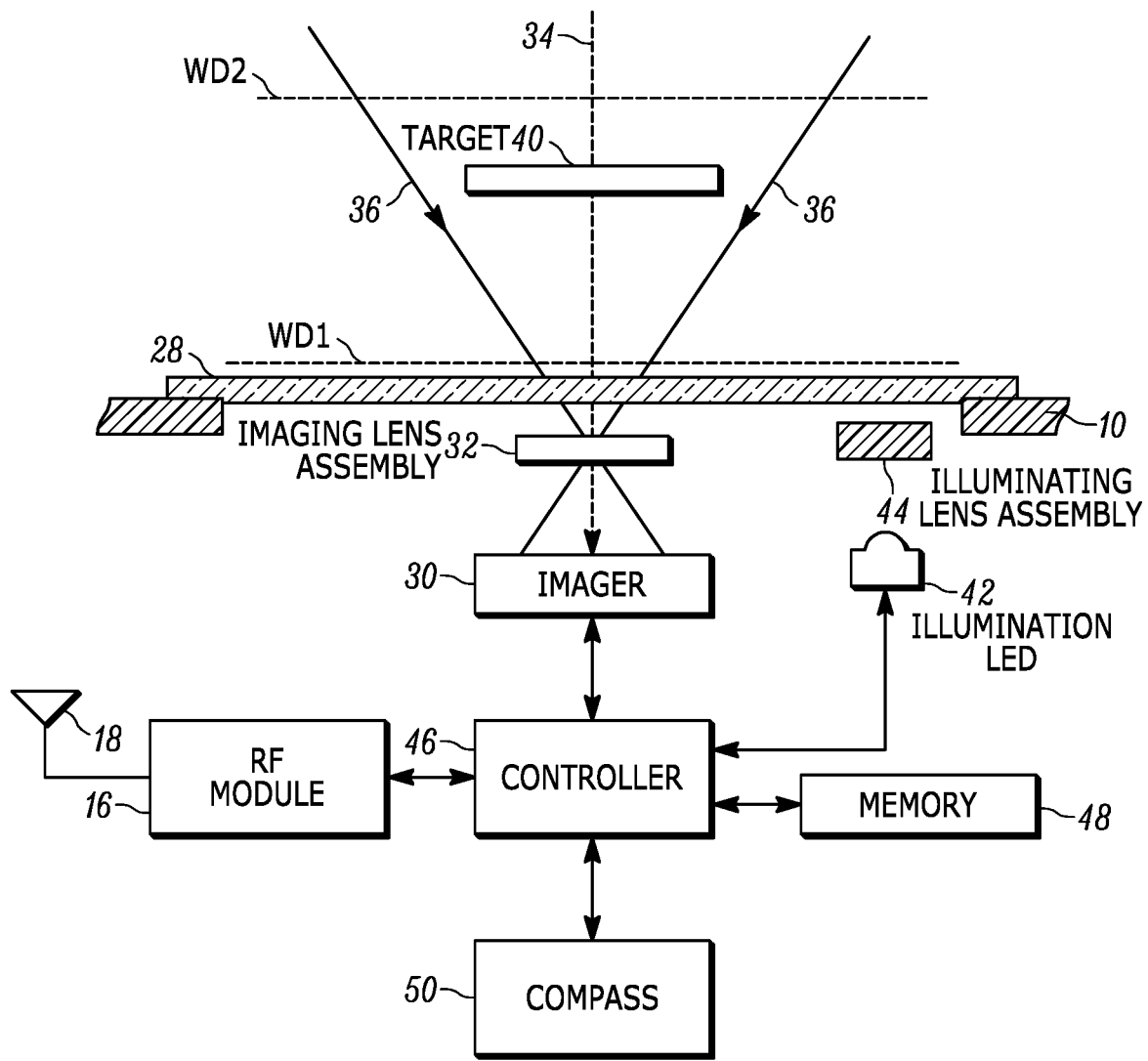
FIG. 2 is a diagrammatic view of some of the components mounted in a mobile communications device depicted in FIG. 1.

Turning now to the drawings, reference numeral 10 in FIG. 1 generally identifies a mobile communications device, such as a smartphone or cellphone, having, among other things, a keyboard 12, a display screen 14, a radio frequency (RF) transceiver module 16, and an antenna 18 operative for communicating over a bi-directional wireless link 20 with a network 22 that is in communication over a bi-directional wireless link 26 with a network server 24. As schematically shown in FIG. 2, the communications device 10 includes a built-in camera having an imager or image sensor 30 and an imaging lens assembly 32 mounted behind a rear window 28 on the communications device 10. The sensor 30 is a solid-state device, for example, a charge coupled device (CCD) or a complementary metal oxide semiconductor (CMOS) device having an array of addressable photocells or pixels arranged in mutually orthogonal rows and columns, and operative for detecting return light captured by the imaging lens assembly 32 over a field of view 36 centered on an imaging or optical axis 34 through the rear window 28. The return light is scattered and/or reflected from a target 40, as described below, over the field of view. The target 40 may be located anywhere in a working range of distances between a close-in working distance (WD1) and a far-out working distance (WD2) relative to the window 28.

In order to increase the amount of the return light captured by the sensor 30, especially in dimly lit environments and/or at far range reading, an illuminating light assembly is also mounted in the device 10 and includes an illumination light source, e.g., a light emitting diode (LED) 42, and an illuminating lens assembly 44 configured to efficiently generate a pattern of illumination light on and along the target 40 to be read by image capture. At least part of the scattered and/or reflected return light is derived from the pattern of illumination light on and along the target 40.

As also shown in FIG. 2, the sensor 30, the LED 42, the RF module 16, and a compass 50 are operatively connected to a controller or microprocessor 46 operative for controlling the operation of these components. A memory 48 is connected and accessible to the controller 46. Preferably, the microprocessor 46 is the same as the one used for processing the return light from the target 40 and for decoding the captured target images when the target is an encoded symbol. In operation, the microprocessor 46 sends a command signal to energize the LED 42 for a short exposure time period, say 500 microseconds or less, and energizes and exposes the sensor 30 to collect the return light, e.g., illumination light and/or ambient light, from the target 40 only during said exposure time period. A typical sensor 30 needs about 18-33 milliseconds to acquire the entire target image and operates at a frame rate of about 30-60 frames per second.

The device 10 is carried and operated by a user who desires access to operate one or more electrical devices, such as a computer 102 or a printer 104, and/or access to enter or exit, or to establish his/her presence at, one or more geographic locations, such as a portal or doorway 106, provided in a defined space or venue, such as a building or an office. To this end, the user communicates with an administration station 110, preferably one having a data entry terminal 52 that is operatively connected to the server 24 via a bi-directional wireless link 120. A human operator at the station 110 enters identification data that identifies the user, and enters phone data that identifies the user's device 10 to a database of the server 24. The identification data may include the person's name. The phone data may include the telephone number of the user's device 10, as well as the media access control (MAC) address that is unique to each device 10.

After entry of the identification data and the phone data, the server 24 sends an application along the wireless links 26, 20 to the user's device 10. The user's device 10 then executes the uploaded application to create a virtual symbol in the user's device 10. This virtual symbol, which comprises a set of virtual characters, typically alphanumeric characters, is stored in the memory 48.

A security symbol 100 is encoded with operating data that enables one or more of the electrical devices 102, 104 to be operated, and/or with access data that enables each geographic location or portal 106 to be accessed. A different security symbol 100 is associated with each electrical device or geographic location. Each security symbol 100 is advantageously configured as a two-dimensional symbol, e.g., a Quick Response (QR) code, a Portable Data File (PDF) 417 code, a Data Matrix (DM) code, or the like. All of these codes are capable of storing data in a quantity much greater than a conventional one-dimensional Universal Product Code (UPC) symbol. The security symbol 100 is displayed in close association with the electrical devices or geographic locations. Preferably, the security symbol 100 is printed on respective media 112, 114, and 116, e.g., sheets of paper or plaques, which are respectively posted and affixed in the vicinity of the electrical devices or geographic locations. If any electrical device has a screen, then the security symbol 100 may be displayed thereon.

The imaging sensor 30 is operated by the user to capture a security image of security characters, typically alphanumeric characters, from the security symbol 100 associated with any of the devices locations 102, 104, and 106, to which the user desires access. The security characters are stored in the memory 48. The controller 46 compares the virtual characters with the security characters, and authenticates the user when the virtual and security characters match.

The administration station 110 may also enter privilege data indicative of privileges granted to the user in the defined space. The privilege data may identify the date and the time parameters during which the authenticated user is permitted to access the defined space. The privilege data may also identify one or more of the geographic locations in the defined space at which the authenticated user is granted access. Advantageously, a route to each such identified geographic location in the defined space may be displayed on the screen 14 of the user's device 10. The compass 50 may be used to identify and track the location of the user and the user's phone 10 in real time, and the server may even generate an alarm if the user deviates from the prescribed route. The privilege data may also identify one or more of the electrical devices in the defined space to be operated by the authenticated user. Thus, the virtual symbol encodes not only the identification data and the phone data, but also encodes the privilege data.

The devices 102 and 104 have been respectively illustrated as a desktop computer and a printer, merely for ease of illustration. It will be understood that any network device or office fixture can be so authenticated and controlled in accordance with this invention. Also, in applications requiring even more security, then the images of one or more security symbols 100 may be required to be captured before being granted access to any one device.

In addition, the large data storage available in the two-dimensional security symbol 100 enables the security symbol to also be encoded with Boolean logic data that requires more than one condition to be satisfied in order to authenticate the user to the defined space. For example, the security symbol associated with the printer 104 may be encoded to not operate unless the computer 102 has already been operated. As another example, the security symbol associated with the computer 102 may be encoded to not operate unless the portal 106 has already been accessed. Thus, the Boolean logic data in the security symbol serves as a Boolean logic controller and can be made as simple or complex as desired for a particular venue. Examples of Boolean logic conditions include, for example, such logic operators as AND, OR, NOR, NOT, NAND, XOR, and XNOR operators, or a combination of such operators, preferably configured in an algorithm.

Figure 3:
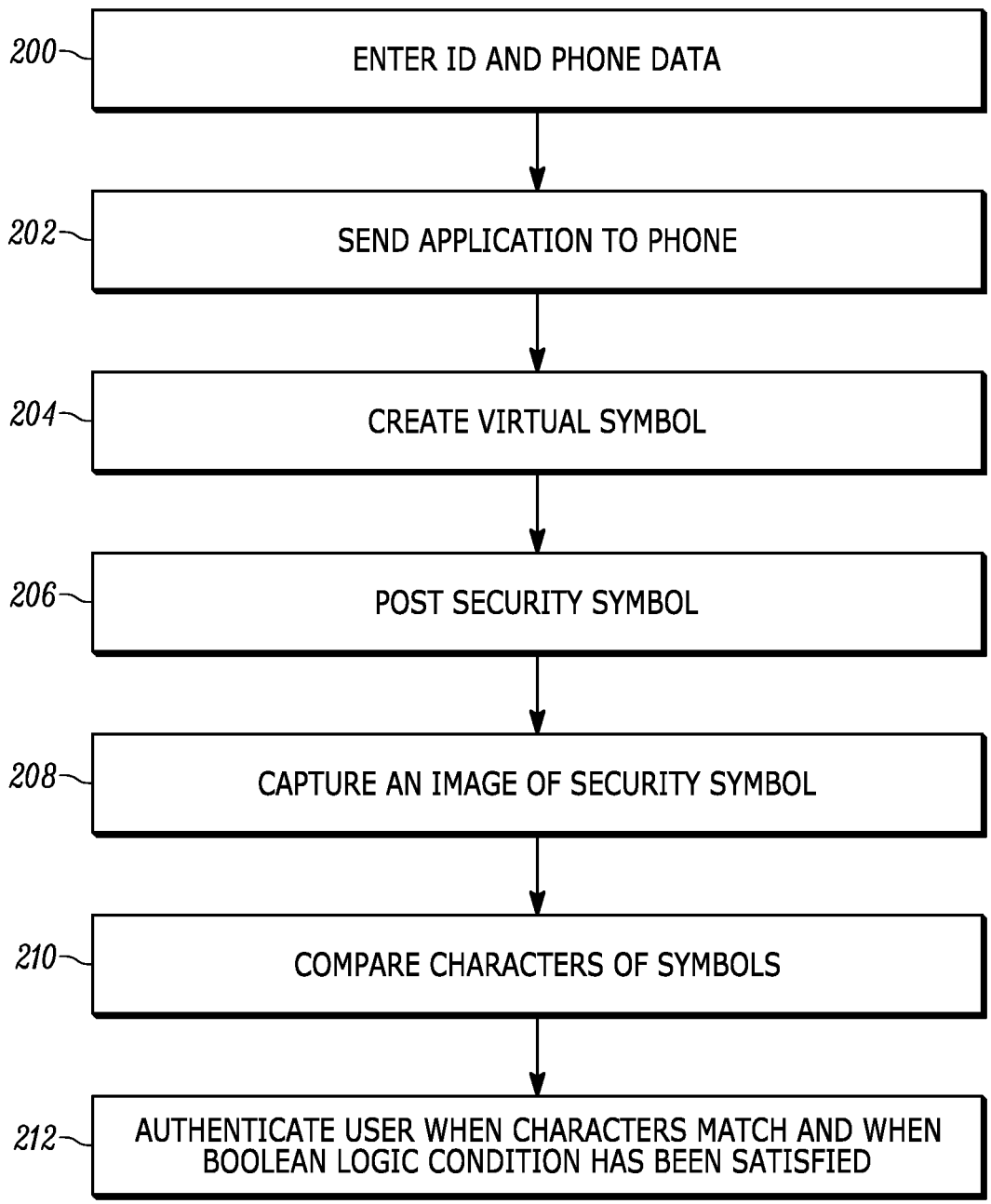
FIG. 3 is a flow chart of a method of authenticating a user to a defined space and/or to operate one or more electrical devices in accordance with this disclosure.

FIG. 3 depicts a flow chart indicating the steps performed in authenticating the user to a venue or defined space. In step 200, identification data and phone data that respectively identify the user and the user's phone are entered in the server 24. In step 202, an application is sent from the server 24 along the wireless links 26, 20 to the user's phone 10 after entry of the identification data and the phone data. In step 204, the application received by the user's phone is executed by the phone 10 to create a virtual symbol of virtual characters in the user's phone 10. In step 206, the security symbol 100 is posted in the defined space. In step 208, a security image of security characters is captured from the security symbol 100 with the user's phone 10. In step 210, the security characters are compared with the virtual characters. In step 212, the user is authenticated to the defined space when the virtual characters match the security characters, and optionally when the Boolean logic condition has been satisfied.

Thus, data is inserted in each unique virtual symbol for a given user, and various limiting privileges and intelligence are specifically allocated to the given user regardless of external security symbols. This prevents entry or privileges in unprivileged allocations, as well as illegal copying of, and moving, an external symbol from one place to another, for the purpose of gaining unprivileged entry or performing unprivileged activity.

It will be understood that each of the elements described above, or two or more together, also may find a useful application in other types of constructions differing from the types described above.

While the invention has been illustrated and described as a method of, and a system for, authenticating a user for security and control, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of authenticating a user to a venue, comprising:
   entering, at a data entry terminal at an administration station, identification data and phone data that respectively identify the user and a phone operated by the user to a server;
   the server sending, after entry of the identification data and the phone data, an executable application from the server along a wireless connection to the user's phone;
   creating a virtual symbol of virtual characters on the user's phone, by operation of a controller in the user's phone, upon the user executing the executable application sent by the server, and storing the virtual characters in a memory in the user's phone;
   posting, and displaying, a security coded symbol in a visual, machine-readable form at the venue, wherein the security coded symbol includes a two-dimensional symbol and wherein the security coded symbol corresponds to a defined space at the venue that includes one or more electrical devices;
   capturing a security image of security characters from the security coded symbol with a solid-state imaging sensor on the user's phone, and storing the security characters in the memory in the user's phone;
   comparing, by operation of the controller in the user's phone, the stored security characters with the stored virtual characters;
   the controller authenticating the user, and granting the authenticated user access to the defined space at the venue, when the stored virtual characters match the stored security characters;
   in response to granting the authenticated user access to the defined space at the venue, displaying on the user's phone a route to first location within the defined space; and
   determining, using a compass of the user's phone, whether the authenticated user has deviated from the route; and
   in response to a determination that the user has deviated from the route, generating an alarm.

2. The method of claim 1, further comprising entering, on the data entry terminal at the administration station, privilege data indicative of privileges granted to the user at the venue.

3. The method of claim 2, wherein the privilege data includes date and time parameters during which the authenticated user is permitted access to the venue.

4. The method of claim 2, wherein the privilege data includes a geographic location in the venue at which the authenticated user is granted access, wherein the geographic location includes the first location.

5. The method of claim 4, further comprising monitoring the compass of the user's phone in a real time.

6. The method of claim 1, wherein the posting of the security coded symbol is performed by applying the security coded symbol on a media, and by affixing the media with the security coded symbol thereon at the venue.

7. The method of claim 2, wherein the privilege data identifies an electrical device at the venue to be operated by the authenticated user.

8. The method of claim 7, wherein the posting of the security coded symbol is performed by displaying the security coded symbol at the electrical device.

9. The method of claim 2, wherein the privilege data includes a Boolean logic condition to be satisfied by the authenticated user.

10. A system for authenticating a user to a venue, comprising:
    a phone operated by the user;
    an administration station having a data entry terminal at which identification data and phone data that respectively identify the user and the user's phone are entered;

a server for receiving the identification data and the phone data from the administration station, and for sending an executable application from the server along a wireless connection to the user's phone;

a controller in the user's phone for creating a virtual symbol of virtual characters in the user's phone upon the user executing the executable application sent from the server to the user's phone;

a security coded symbol in a visual, machine-readable form posted and displayed at the venue wherein the security coded symbol includes a two-dimensional symbol and wherein the security coded symbol corresponds to a defined space at the venue that includes one or more electrical devices;

a solid-state imaging sensor on the user's phone for capturing a security image of security characters from the security coded symbol;

a memory in the user's phone for storing the virtual characters and the security characters; and the controller in the user's phone being operative for comparing the stored security characters with the stored virtual characters, and for authenticating the user, and for granting the authenticated user access to the at least the defined space at the venue, when the stored virtual characters match the stored security characters, wherein the server:

in response to granting the authenticated user access to the defined space at the venue, displaying on the user's phone a route to first location within the defined space; and determining, using a compass of the user's phone, whether the authenticated user has deviated from the route; and in response to a determination that the user has deviated from the route, generating an alarm.

* * * * *